United States Patent
Strolle et al.

[11] Patent Number: 5,870,522
[45] Date of Patent: *Feb. 9, 1999

[54] BACKWARD COMPATIBLE HDTV RECORDING/REPRODUCING SYSTEM

[75] Inventors: Christopher H. Strolle, Glenside, Pa.; Jung Wan Ko, Lawrenceville, N.J.

[73] Assignee: SamSung Electronics Co., Ltd., Suwon, Rep. of Korea

[*] Notice: The term of this patent shall not extend beyond the expiration date of Pat. No. 5,623,573.

[21] Appl. No.: 475,430

[22] Filed: Jun. 7, 1995

Related U.S. Application Data

[63] Continuation of Ser. No. 157,340, Nov. 24, 1993, Pat. No. 5,623,573, which is a continuation of Ser. No. 899,305, Jun. 16, 1992, abandoned.

[51] Int. Cl.⁶ .............................. H04N 5/78; H04N 5/782
[52] U.S. Cl. .................. 386/92; 360/21; 360/48; 386/74; 386/123
[58] Field of Search .................. 360/48, 32, 41, 360/21; 358/335; 386/131, 124, 123, 112, 111, 109, 46, 92, 74

[56] References Cited

U.S. PATENT DOCUMENTS

| | | | |
|---|---|---|---|
| 3,425,816 | 2/1969 | Kihara | 65/30 |
| 4,296,430 | 10/1981 | Warren | 358/8 |
| 4,591,924 | 5/1986 | Miura et al. | 350/330 |
| 4,605,611 | 8/1986 | Ohno et al. | 430/393 |
| 4,607,293 | 8/1986 | Okada et al. | 360/21 X |
| 4,660,072 | 4/1987 | Fukinuki | 358/12 |
| 4,660,104 | 4/1987 | Higurashi | 358/343 X |
| 4,679,097 | 7/1987 | Tomita | 358/328 |
| 4,720,751 | 1/1988 | Peters | 358/310 |
| 4,742,386 | 5/1988 | Wilkinson | 358/13 |
| 4,745,460 | 5/1988 | Fukinuki | 358/12 |
| 4,811,116 | 3/1989 | Baumeister | 358/310 |
| 4,831,463 | 5/1989 | Faroudja | 358/310 |
| 4,843,485 | 6/1989 | Reitmeier | 360/9.1 |
| 4,870,481 | 9/1989 | Kawamata | 358/31 |
| 4,885,631 | 12/1989 | Fukinuki | 358/21 R |
| 4,901,159 | 2/1990 | Hitotsumachi | 358/330 |
| 4,928,186 | 5/1990 | Matsumoto et al. | 360/21 |
| 4,941,055 | 7/1990 | Fujimoto | 358/340 |
| 4,943,848 | 7/1990 | Fukinuki | 358/12 |
| 4,949,173 | 8/1990 | Mitsuhashi | 360/33.1 X |

(List continued on next page.)

FOREIGN PATENT DOCUMENTS 27 02 971 C2  9/1988  Germany.

OTHER PUBLICATIONS

Claus Biasch–Wiebke, Videosysteme, Vogel Buchverlag 1991, pp. 87, 88.

*Primary Examiner*—Alan Faber
*Attorney, Agent, or Firm*—Robert E. Bushnell, Esq.

[57] ABSTRACT

A magnetic tape recording with a new signal encoding format, apparatus for recording this format and reproducing apparatus for reproducing signals from this format. A standard VHS signal is recorded as a first set of parallel slant tracks having a predetermined spacing between each slant track. A high definition television signal is recorded in pairs of slant tracks of a second type that flank a slant track of the first type and are narrower in width than the slant track of the first type they flank. Additionally, the azimuth angle of the tracks of the first type alternates between different predetermined values for successive tracks, and the azimuth angle of the tracks of the second type differ both from the azimuth angle of the tracks of the first type which they flank, and from the azimuth angle of the tracks of the second type which are positioned next to them in the space between tracks of the first type. This format allows one tape to record both a high definition television signal and a standard VHS signal, which standard VHS signal can be played back using ordinary tape machines. Accordingly, this format provides a way to avoid the problem of having to carry a dual inventory of tapes in a tape sales or rental business.

13 Claims, 4 Drawing Sheets

30 & 31 ARE A PAIR OF DUPLICATELY RECORDED TRACKS.
32 & 33 ARE A PAIR OF DUPLICATELY RECORDED TRACKS.
34 & 35 ARE A PAIR OF DUPLICATELY RECORDED TRACKS.
36 & 37 ARE A PAIR OF DUPLICATELY RECORDED TRACKS.

U.S. PATENT DOCUMENTS

| | | | |
|---|---|---|---|
| 4,963,991 | 10/1990 | Honjo | 358/310 |
| 4,984,093 | 1/1991 | Schmidtmann et al. | 358/330 |
| 5,031,030 | 7/1991 | Hurst, Jr. | 358/12 |
| 5,049,992 | 9/1991 | Citta et al. | 348/443 |
| 5,050,010 | 9/1991 | Park | 360/33.1 |
| 5,060,077 | 10/1991 | Koya et al. | 358/312 X |
| 5,063,457 | 11/1991 | Ishikawa et al. | 358/330 |
| 5,113,262 | 5/1992 | Strolle et al. | 358/310 |
| 5,182,642 | 1/1993 | Gersdorff et al. | 358/133 |
| 5,257,107 | 10/1993 | Hwang et al. | 358/310 |
| 5,623,573 | 4/1997 | Strolle et al. | 386/92 |

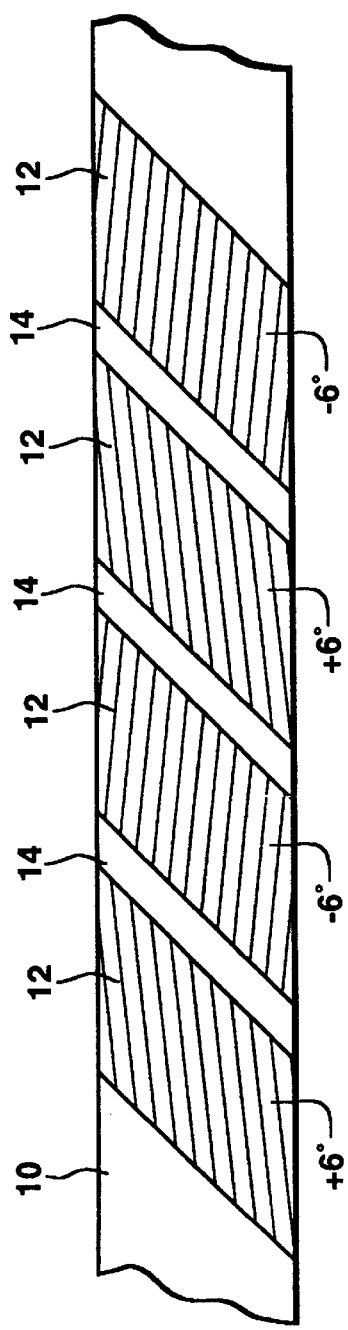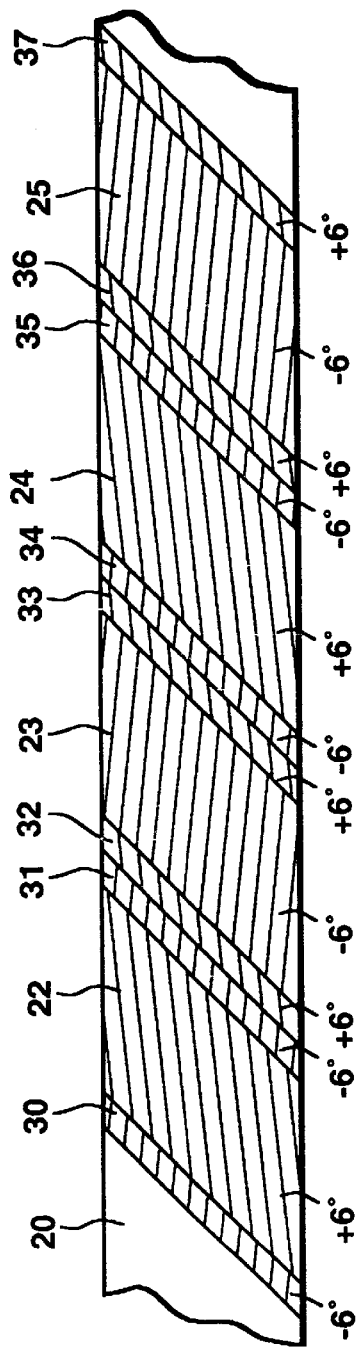

30' & 31' ARE A PAIR OF DUPLICATELY RECORDED TRACKS.
32' & 33' ARE A PAIR OF DUPLICATELY RECORDED TRACKS.
34' & 35' ARE A PAIR OF DUPLICATELY RECORDED TRACKS.
36' & 37' ARE A PAIR OF DUPLICATELY RECORDED TRACKS.

BACKWARD COMPATIBLE HDTV RECORDING/REPRODUCING SYSTEM

This is a continuation of application Ser. No. 08/157,340 filed on 24 Nov. 1993, now U.S. Pat. No. 5,623,573, which is a continuation of application Ser. No. 07/899,305 filed on 16 Jun. 1992 and now abandoned.

BACKGROUND OF THE INVENTION

1. Field of the Invention

The present invention relates to a magnetic tape recording/reproducing format and apparatus in accordance therewith, and more particularly, to an HDTV recording/reproducing magnetic tape format and apparatus which has backward compatibility to another format, such as the standard VHS television signal recording format.

2. Description of the Prior Art

U.S. Pat. No. 4,963,991 issued to Honjo on Oct. 16, 1990 discloses a tape recording format and recorder apparatus which allows recording/reproduction of television signals in both a narrow bandwidth format, such as a conventional NTSC signal having a bandwidth of approximately 4 mHz, and a wide bandwidth format, such as a high definition television signal (HDTV) having a bandwidth of 8–20 mHz. This is accomplished by recording only one of the narrow bandwidth or wide bandwidth signals on the tape at a time. When wide bandwidth signals are recorded, instead of increasing the speed of the recording tape, two smaller heads are used for digitally recording time-expanded channels of the wide bandwidth signal, and the speed of the rotating drum in which the recording heads are mounted is correspondingly increased. Thus, tape speed is the same for both formats. However, since only one format at a time is recorded on the tape, video tape players not equipped to play the television signal which was selected for recording on the tape will not be able to use these tapes.

U.S. Pat. No. 4,941,055 issued on Jul. 10, 1990 to Fujimoto discloses a format for magnetic recording on a video floppy disk a wide band video signal which is divided into two signals; one, a low frequency component in the frequency range below 4 mHz, and the other in the high frequency range, 4–6 mHz. The low frequency component is recorded in a plurality of main slant tracks having spaces therebetween, and the high frequency component is recorded in the guard band between the main tracks and at an azimuth angle which is different from the main track in order to minimize pick-up of the adjacent track during head mistracking. (The azimuth angles of heads on headwheels used for helically scanning a magnetic tape are customarily measured with respect to a line perpendicular to headwheel rotation, and the azimuth angles of recorded tracks refer back to these heads used in recording them in a magnetic tape surface; these customs are followed in this specification and its accompanying drawings.) Although two track recording is disclosed, only one television signal format is recorded/reproduced. Thus, there is no simultaneous compatibility with another television signal recording format, which would increase the desirability and user demand for such tapes when pre-recorded with multiple television signal formats. Furthermore, since the total frequency content of a single signal is split among two channels and two recording/pick-up heads, it is the belief of the present inventors that time-base errors will necessarily exist between the reproduced signals which will be impossible to correct with even the best time base correctors, thereby resulting in unacceptable HDTV performance.

U.S. Pat. No. 4,843,485 issued to Reitmeier on Jun. 27, 1989 discloses a recording format and recording/reproducing apparatus in accordance therewith which simultaneously provides for recording/reproducing one of either a wide bandwidth (studio quality) signal or a narrow bandwidth (portable quality) television signal on a magnetic tape. Here, the tape is longitudinally divided into upper and lower halves. Each half receives digital recording of one half of the signal components of the wide bandwidth signal, so that pick-up of only one longitudinal track results in reproduction of a low quality signal, while pick-up of both tracks simultaneously results in a high quality signal.

U.S. Pat. No. 4,928,186 issued to Matsamoto et al. on May 22, 1990 discloses a tape recording format and recording/reproducing apparatus in accordance therewith which records a video signal on the main tracks of a video floppy disk, and also records additional information (audio) in the guard band space which exists between the main tracks. An additional aspect of this patent is that the guard band signal should be recorded with an electromotive force which is only 40–80% of the electromotive force used in the main tracks, in order to minimize deterioration of the main tracks during recording of the guard band tracks.

It is an object of the present invention to provide a magnetic media recording format which allows recording of two different signals in two different formats on one media, and selective reproduction of signals from either one of the two recorded formats.

It is a further object of the invention to provide a recording format in which it is relatively simple to record and then reproduce signals therefrom.

These and other objects of the invention will become apparent from the following detailed description of a preferred embodiment of the invention, the accompanying drawings and the claims.

SUMMARY OF THE INVENTION

A magnetic recording media having a recording format thereon of the type comprising, a plurality of a first type of parallel slant tracks recorded on the magnetic media, the first type of tracks having a predetermined spacing therebetween, a given track width, and a given azimuth angle, and a plurality of a second type of slant tracks which are parallel to the first type and recorded on the magnetic media, the width of the second type of tracks being substantially one-half the predetermined spacing between successive tracks of the first type so that two tracks of the second type are positioned between each track of the first type.

Furthermore, apparatus for recording signals on a recording medium in accordance with the invention, comprises first means for recording a first information signal on the medium as a plurality of a first type of parallel slant tracks having a predetermined spacing therebetween, a given bandwidth and a given azimuth angle, and second means for recording a second information signal on the medium as a plurality of a second type of slant tracks which are parallel to the first type, the second type of tracks having a width substantially equal to one-half the spacing between successive ones of the first type of tracks so that two tracks of the second type are recorded between each track of the first type.

In accordance with one aspect of the invention, the azimuth angle of the second type of tracks is opposite from the azimuth angle from the first type of tracks and furthermore has an azimuth angle at least twice as great as the azimuth angle of the first type of tracks.

In accordance with a further aspect of the invention, the first information signal comprises a standard analog VHS signal and the second information signal comprises a digitized and randomized HDTV signal.

In accordance with a still further aspect of the invention, the second type of tracks are intitially formed using a relatively wide head and the first type of tracks are formed by the centering of a relatively narrower head within the track generated by the relatively wide head, so as to form a track of the first type which has tracks of the second type on either side thereof.

BRIEF DESCRIPTION OF THE DRAWINGS

FIG. 1 illustrates a conventional track format on a video tape formed by a two-head VHS VTR;

FIG. 2 illustrates a track format in accordance with the invention having standard VHS tracks which are straddled flanked on opposite sides by additional tracks for recording/reproducing an additional information signal in accordance with the invention;

Figure 3:
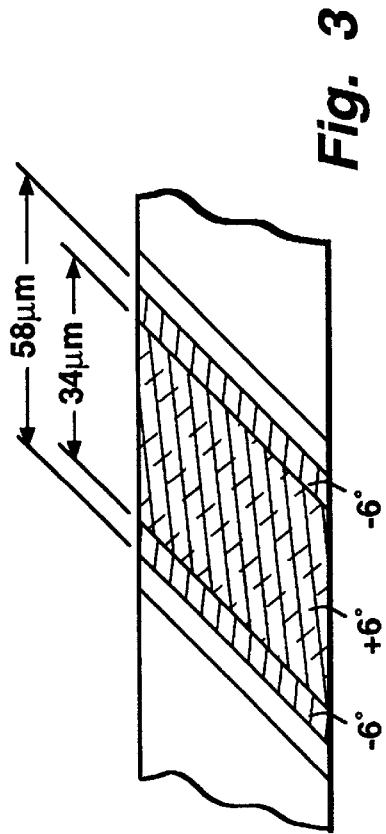
FIG. 3 illustrates one method useful for creating the track format shown in FIG. 2.

DETAILED DESCRIPTION OF THE
PREFERRED EMBODIMENTS OF THE
INVENTION

FIG. 1 illustrates a conventional track format on a video tape 10 for a two-head VHS VTR when recording in the two-hour mode. The two-head VTR has heads that are 34 micrometers wide, which trace parallel slant tracks 12 and leave an unused space or guard band 14 which is 24 micrometers wide therebetween. As well known to those skilled in VTR technology, the recording/reproducing heads are aligned at a predetermined azimuth angle in order to prevent pick-up of signal from an adjacent track in the event that during reproduction the pick-up head scans the adjacent track (mistracking). As indicated in FIG. 1, two recording heads are used which have opposite azimuth angles of +6° and −6°, respectively. It is noted that four-head machines typically have two wide recording heads of 58 micrometers wide each, which are used for the two-hour recording mode. In this case there would be no guard band between the parallel slant tracks. As well known, the 58 micrometer wide tracks are fully compatible with reproduction by a VTR having 34 micrometer wide heads. The four-head VTR also has 34 micrometer wide heads for use in the four- and six-hour recording modes.

The present invention takes advantage of the fact that in the two-hour VHS recording formats, only 34 micrometer wide tracks are needed for compatibility with the VHS system and that therefore auxiliary information can be recorded in the unused guard band portions of the tape while the main tracks of the tape record standard VHS signals. Thus, a tape is provided which allows the recording/reproduction of auxiliary signals, an is also backward compatible with the standard VHS system. In the preferred embodiment of the invention, the auxiliary information is not a fractional bandwidth component of the standard VHS signal in order to augment or improve its resolution, but is a separate signal such as a digital HDTV signal, a wide screen TV signal, or other TV signal having better definition than that offered by standard VHS, and the standard VHS signal is recorded in the main tracks.

FIG. 2 illustrates the new track format recorded on a video tape 20 having standard VHS tracks 20–25 which are each 34 micrometers wide and have a successively alternating azimuth angle of +6° and −6° therebetween. Thus, these tracks are compatible with recording/reproduction of standard VHS signals by VTR's having either 34 micrometer wide or 58 micrometer wide heads. Additionally, tape 20 has pairs of auxiliary information tracks 30–37 which flanked the opposite sides of each standard VHS track. Thus, there are two auxiliary tracks associated with each standard VHS track, which are available for recording/reproducing an additional signal, preferably an HDTV signal. These tracks are "hidden" from pick-up during head mistracking in the standard VHS mode by using an azimuth angle for the auxiliary tracks which straddle each standard track which is opposite from that used by the straddled VHS standard track. This combination of three tracks, a VHS track of a given azimuth angle, straddled by two narrower tracks of equal azimuth angle but different from the azimuth angle of their intermediate VHS track, is called a composite track.

With this format, three essential objectives are met. First, the azimuth angle of successive VHS tracks is maintained for compatibility with standard VHS. Second, when the VTR is acting as a VHS player, it does not see that auxiliary tracks because they are of a different (preferably opposite) azimuth angle. Third, alternation of azimuth angles between all successive tracks, both VHS and auxiliary, is achieved. These second and third objectives ensure that the auxiliary tracks will have the same azimuth rejection capability during playback which is so important to narrow track recording. Azimuth rejection is less effective at lower recording frequencies, so the information signal of the auxiliary tracks is pre-adjusted so as to be free of low frequencies. This is standard practice in digital recording systems using azimuth heads. During playback of the signal from the auxiliary tracks, the low frequency portion is not used. By increasing the azimuth angle beyond 6° for the auxiliary tracks, it would be possible to achieve greater rejection at lower frequencies. This would allow a lower frequency band edge for the auxiliary tracks to be utilized, further increasing the available bandwidth in the auxiliary tracks. The same azimuth rejection for VHS playback and auxiliary track playback would be maintained. An additional advantage to increasing the azimuth angle of the auxiliary tracks is to improve the backward compatibility aspect of the format. That is, during playback, the +6° head, reading the +6° VHS track, if severely mistracking, could pick-up signals from the nearest +6 auxiliary track (which is two tracks away) causing a moire pattern in the VHS signal. This is also true for the −6° VHS head. Increasing the azimuth angles of the auxiliary tracks to, for example, +18° and −18°, respectively, would substantially solve this problem.

Figure 6:
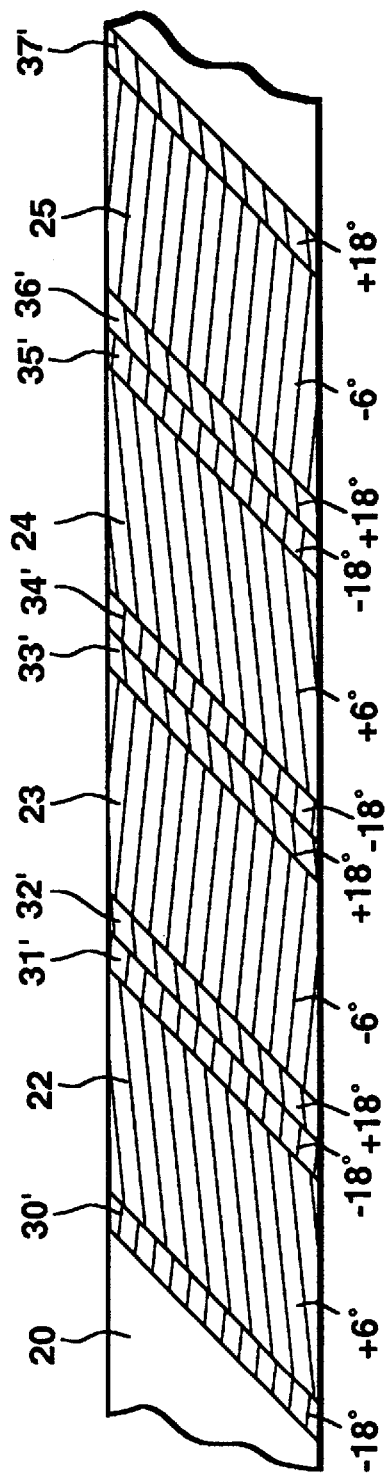
FIG. 6 illustrates an alternative track format in accordance with the invention having standard VHS tracks which are flanked by additional tracks for recording/reproducing an additional information signal in accordance with the invention.

FIG. 6 illustrates this alternative. In FIG. 6 the FIG. 2 tracks 30, 31, 34 and 35 having −6° azimuth angles are replaced by tracks 30', 31', 34' and 35' having −18° azimuth angles; and the FIG. 2 tracks 32, 33, 36 and 37 having +6° azimuth angles are replaced by tracks 32', 33', 36' and 37' having +18° azimuth angles.

Although one would think that the track format of FIG. 2 would require at least one pair of heads for recording the auxiliary tracks, in accordance with a further aspect of the invention shown in FIG. 3, the auxiliary tracks are created by first recording a relatively wide track (i.e., 58 micrometers) using the auxiliary information, and then recording a 34 micrometer standard VHS track of opposite azimuth angle in the middle of the wide auxiliary track, thereby forming the composite three-track format.

In accordance with a further feature of the invention, the azimuth angle of the wide track can differ by a factor of two or even three from that of the narrow tracks, in order to further reduce cross-pickup during head mistracking.

In accordance with an even further feature of the invention, to further minimize "cross-talk" interference between the standard VHS and the auxiliary signal due to mistracking, it is preferable that the auxiliary signal be a digital signal without low frequency components that could interfere with the analog VHS signal.

In accordance with a still further feature of the invention, a further improvement in reducing the signal degradation due to mistracking can be had if the digital signal is randomized with respect to time, a technique well known to those skilled the digital signal processing technology. When the information content of the auxiliary signal is randomized, a severe mistracking, which would normally result in a loss of some information in the auxiliary signal, will not repetitively degrade the signal of information content at the same point in the image which would otherwise lead to visible bands of interference.

Figure 4:
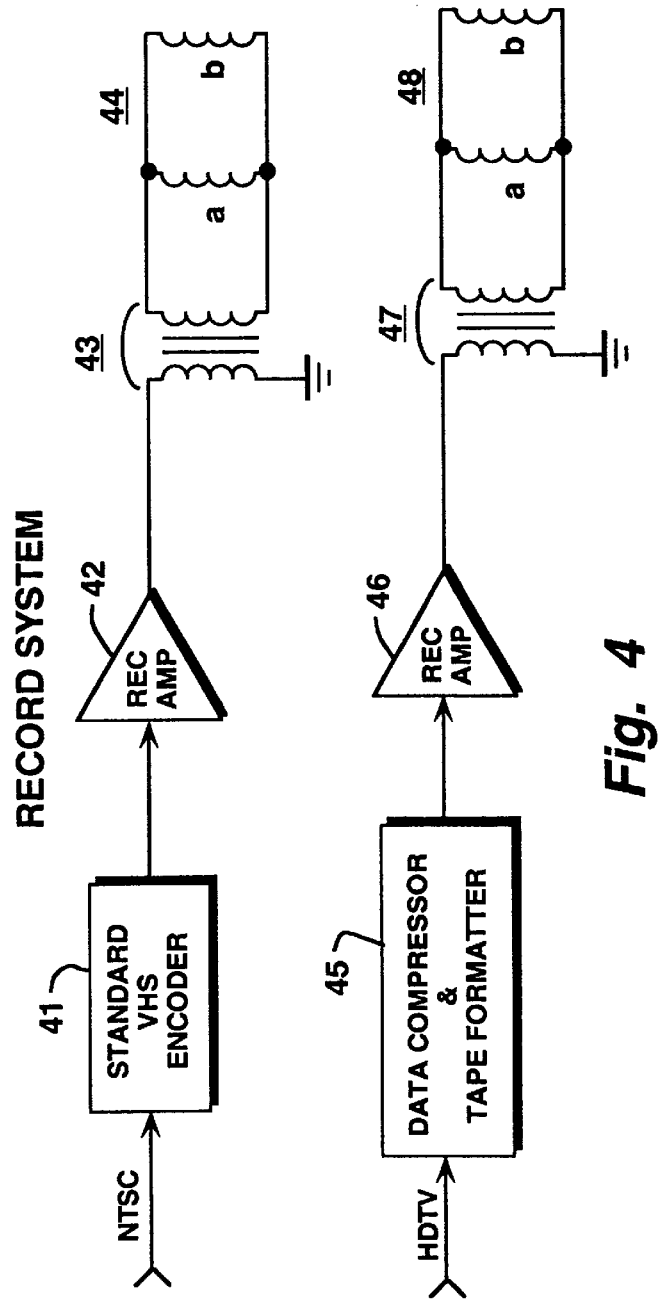
FIG. 4 illustrates a record apparatus in accordance with the present invention.

FIG. 4 illustrates a record apparatus in accordance with the present invention for recording tapes having a format shown in FIG. 2. Since VTR circuitry is so widely known, only a simple block diagram and brief description is deemed necessary.

A source, not shown, provides a standard NTSC color video signal, i.e., a 525 line interlaced TV signal having luminance and chrominance components, to a standard VHS encoder 41. As well known, encoder 41 processes the NTSC signal in accordance with the "color-under" technique, wherein an FM modulated luminance signal is combined with a lower frequency subcarrier having the chrominance information. The signals are added together at the output of encoder 41 and are then brought to the proper amplitude level via a record amplifier 42. A rotating transformer 43 applies these signals to magnetic recording heads 44a and 44b which are mounted on a rotating drum (not shown), which is positioned so that the tape is caused to be in moving contact therewith. The chrominance subcarrier is then recorded on the video tape using the FM modulated luminance signal as a bias.

Magnetic recording heads 44a and 44b are oriented on the drum (not shown) so as to create the standard VHS tracks having the well known alternating azimuth angles such as +6° and −6°, respectively, as shown in FIG. 2. These heads are 34 micrometers wide. However, as noted with respect to the recording technique of FIG. 3, these tracks are recorded after recordation of the auxiliary tracks, and is centered with respect to the recording of the auxiliary tracks.

The auxiliary track information, preferably a digitized and randomized HDTV signal is applied to a data compressor and tape formatter processing block 45. Video compression encoding is required due to bandwidth limitations in the auxiliary tracks. Several different types of digital video compression techniques are well known, such as the JPEG (Joint Photograph Experts Group) which uses discrete cosine transforms (DCT) and MPEG (Moving Pictures Experts Group) which uses DST in conjunction with intra- and inter-frame compression algorithms. An article by Ang et al. in IEEE Spectrum, October 1991, Pages 16–19, entitled "Video Compression Makes Big Gains" can be referred to for more information about compression of HDTV signals.

Formatting of the digitized signal can be done using any of several well known formats which divide the data stream to be recorded in sub-units or blocks, including, e.g., synchronizing data, identification codes and image information. One such format usable herein is the well known D1 Standard proposed by SMPTE (Society of Motion Picture and Television Engineers).

Additionally, since in a high-density recording (such as the HDTV auxiliary track) the playback signal strength is relatively low, and furthermore, the playback can be degraded even further due to head mistracking and head-to-tape space variations, a NRZ recording format can also be used. The techniques and advantages of various types of NRZ recording formats are discussed in an article by Nakazawa et al. entitled "A Study on Detection Methods of NRZ Recording" published in IEEE Transactions on Magnetics, Vol. MAG-16, No. 1, January 1980, Pages 104–110.

The digitized, data compressed and formatted HDTV signal is then brought to a proper amplitude level for recording by a record amplifier 46, and a rotary transformer 47 applies the signal to recording heads 48a, 48b having opposite azimuth angles. In accordance with the recording technique of FIG. 3, heads 48a and 48b are each 58 micrometers wide and are mounted on the rotating drum (not shown) which has heads 44a and 44b, and are positioned so that their signal is recorded in the magnetic tape 20 first, and the signal from heads 44a and 44b are recorded thereafter in the middle portion of each earlier recorded track. This results in the formation of magnetic tape having the format shown in FIGS. 2 and 3. Alternatively, processing block 50 could divide the signal into two components and record each individually, but simultaneously, using an additional pair of auxiliary track heads, each pair of auxiliary track heads producing a 12 micrometer wide track, such as shown in FIG. 2. At the present time, however, this technique is not preferred by the inventors due to the complexity caused by having four recording heads for the auxiliary tracks.

Figure 5:
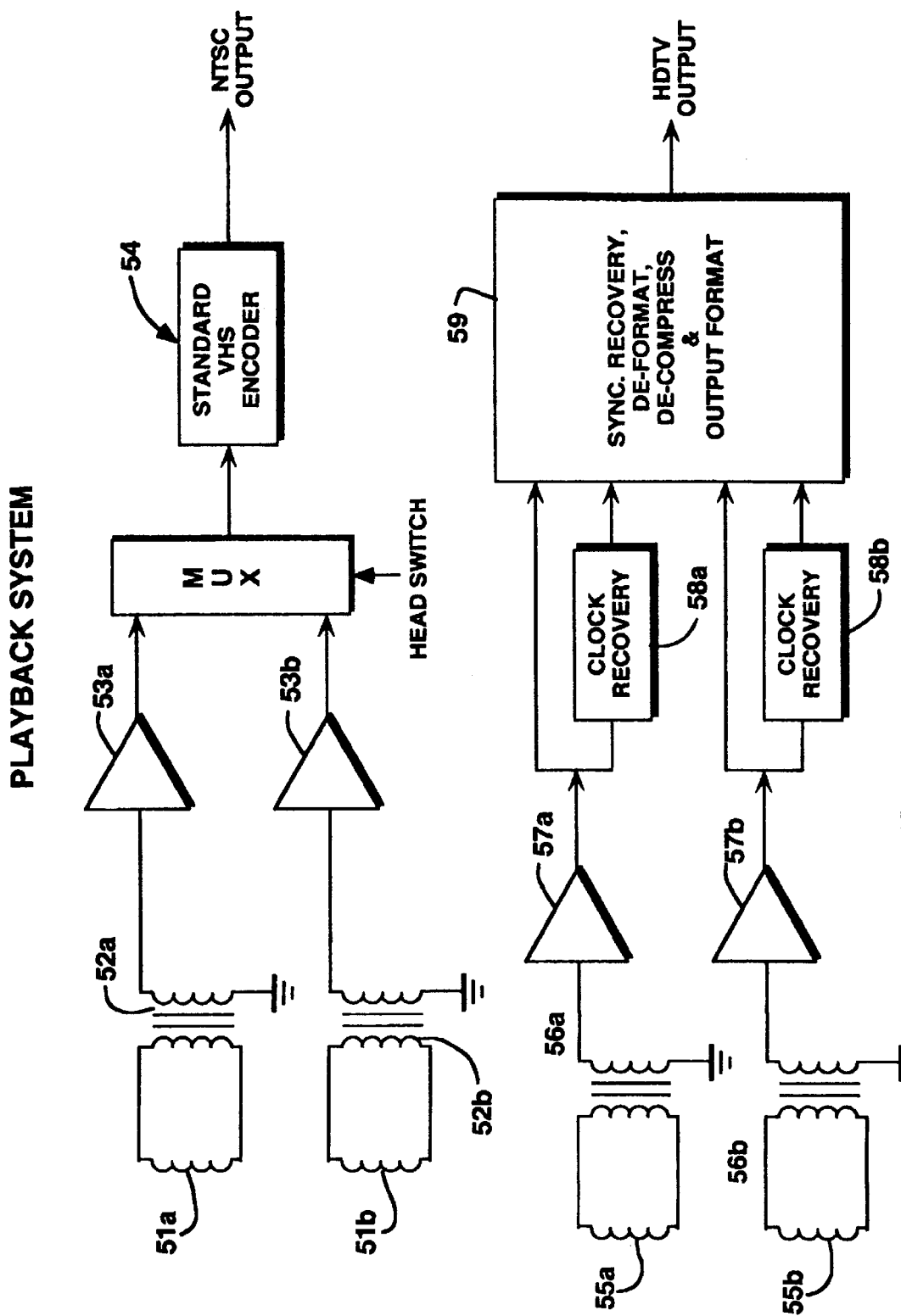
FIG. 5 illustrates a playback apparatus for playback of magnetic tapes having the format of FIG. 2

FIG. 5 illustrates a playback apparatus for playback of magnetic tape having the format of FIG. 2, which is essentially the inverse of the record apparatus shown in FIG. 4. The standard VHS track information is converted to an electrical signal by magnetic pick-up heads 51a, 51b and applied via a rotary transformers 52a and 52b to playback amplifiers 53a and 53b which increase the amplitude level of the recovered signals. Amplifiers 53 not only increases the amplitude of the recovered signals, but also correct for amplitude roll-off and phase shift characteristics which are inherent in magnetic recording processes. A multiplexer combines the signals recovered from heads 51a and 51b into a single signal, using a headswitch signal, as well known. A standard VHS decoder 54 recovers and recombines the luminance and chrominance signals into a standard NTSC signal.

Pick-up heads 55a and 55b each convert the auxiliary track information recorded at their respective azimuth angle into electrical signal, and rotary transformers 56a and 56b apply these signals to playback amplifiers 57a and 57b. Amplifiers 57 not only increase the amplitude of the recovered signals, but also correct for amplitude roll-off and phase shift characteristics which are inherent in magnetic recording processes. Clock recovery circuits 58a and 58b are used to recover a clock signal from the recovered signal, and the clock signal from circuits 58 and the recovered data from amplifiers 57 are all applied to a sync recovery, deformat, decompress and output format processing block 59. Block 59 analyzes the recovered digitized auxiliary signal and reconstructs the HDTV signal therefrom in accordance with the inverse of the formatting and compressing techniques which were applied during the recording of the HDTV information, thereby generating the recovered HDTV signal at its output. As previously noted with respect to the optional use of two pairs of recording heads for recording the auxiliary tracks, the pick-up heads could also be arranged as two pairs of pick-up heads, each only 12 micrometers wide, but such an arrangement is not preferred at the present time due to its complexity.

Pleas note that in the present consumer market, the playback apparatus would only need to recover one of the recorded signal types, either VHS or HDTV. If, in the future, the recorded signals are such that they should be combined for forming the displayed images, the playback apparatus would have the full playback structure shown in FIG. 5.

Thus, there has been shown and described a novel magnetic recording/reproducing media format and apparatus in accordance therewith which fulfills all the objects and advantages sought therefore. Many changes, modifications, variations and other uses and applications of the subject invention will, however, become apparent to those skilled in the art after considering this specification and the accompanying drawings, which disclose a preferred embodiment thereof. For example, it may be desireable to record the standard VHS signals in the main tracks, and an augmentation signal in the auxiliary tracks, which augmentation signal can be combined with the VHS signal to provide a HDTV or wide aspect ratio signal. In this case, the playback apparatus would have the capability to recover both of the recorded signal types. All such changes, modifications, variations and other uses and applications of the invention are deemed to be covered by the claims which follow.

We claim:

1. A magnetic tape containing a recorded VHS signal and a recorded non-VHS signal in accordance with a modified recording format that is backward compatible with the conventional VHS recording format, said modified recording format comprising:

a plurality of regularly spaced, parallel slant tracks of a first type recording said VHS signal and diagonally crossing said magnetic tape at a predetermined angle similar to that in said conventional VHS recording format, each track of said first type having a predetermined spacing from closest neighboring others of said tracks of said first type similar to that in said conventional VHS recording format, having a first track width similar to that in said conventional VHS recording format, and having azimuth angles similar to that in said conventional VHS recording format, and a respective pair of slant tracks of a second type flanking each slant track of said first type and recording said non-VHS signal on the magnetic recording medium, said recorded non-VHS signal conveying information not conveyed in said recorded VHS signal, the azimuth angle of each said pair of slant tracks of a second type being different from the azimuth angle of the slant track of said first type they respectively flank, the width of each slant track of said second type being substantially one-half the predetermined spacing between the slant tracks of said first type, so that two respective tracks of said second type are positioned in, and substantially fill said predetermined spacing.

2. The magnetic tape of claim 1, wherein:

the azimuth angle of successive slant tracks of said first type alternate between two oppositely directed angles, and the azimuth angle of each pair of slant tracks of said second type is greater by a factor at least two than the azimuth angle of the slant track of said first type they respectively flank.

3. The magnetic tape of claim 1, wherein said recorded non-VHS signal contains high-definition television information in compressed form, developed by discrete cosine transformation of said high-definition television information and by intra-frame and inter-frame compression of the resulting discrete cosine transforms.

4. The magnetic tape of claim 3, wherein said high-definition television information is recorded as said recorded non-VHS signal in compressed form using non-return-to-zero modulation.

5. The magnetic tape of claim 1, wherein said recorded non-VHS signal is formed by non-return-to-zero modulation of high-definition television information.

6. A method for recording signals on a magnetic tape helically scanned during recording by a headwheel assembly including a first widetrack head followed in the forward direction of tape transportation by a first narrowtrack head on a first side of said headwheel assembly and including a second widetrack head followed in the forward direction of tape transportation by a second narrowtrack head on another side of said headwheel assembly rotated from said first side, said method comprising the steps of:

applying a non-VHS recording signal to said first and second widetrack heads to create a contiguous set of uniform-width, relatively wide width parallel recording tracks diagonally crossing said magnetic tape;

applying a VHS recording signal to said first and second narrowtrack heads for recording a respective set of uniform-width, relatively narrow width recording tracks over the central portion of each of said relatively wide width parallel recording tracks, thereby to leave a pair of tracks recording said non-VHS recording signal flanking each relatively narrow width recording track recording said VHS recording signal.

7. A magnetic tape recorded in accordance with the method of claim 6.

8. Apparatus for performing the method of claim 6.

9. The method of claim 6, further comprising the step of:

developing said non-VHS signal in response to high-definition television information.

10. The method of claim 9, wherein said step of developing said non-VHS signal comprises substeps of:

discrete cosine transforming said high-definition television information;

compressing the resulting discrete cosine transforms with intra-frame and inter-frame compression techniques to generate digitally coded high-definition television information; and formatting the digitally coded high-definition television information into data blocks, and generating non-return-to-zero modulation in response to the formatted digitally coded high-definition television information, for developing said non-VHS signal.

11. A magnetic recording medium having a recording format thereon of the type comprising:

a plurality of a first type of parallel slant tracks recorded with a first information signal on the magnetic recording medium, said first type of tracks having a predetermined spacing therebetween, a given track width, and a given azimuth angle; and a plurality of a second type of slant tracks which are parallel to the slant tracks of said first type and recorded with non-return-to-zero modulation of a second information signal different from said first information signal on the magnetic recording medium, the width of the slant tracks of said second type being substantially one-half the predetermined spacing between the slant tracks of said first type so that two slant tracks of said second type are positioned between adjacent tracks of said first type, wherein said non-return-to-zero modulation of said second information signal conveys high-definition television information in compressed form, developed by discrete cosine transformation of said high-definition television information and by intra-frame and inter-frame compression of the resulting discrete cosine transforms.

12. A magnetic tape containing a recorded VHS signal and another recorded signal, in accordance with a modified recording format that is backward compatible with a conventional VHS recording format, said modified recording format comprising:

a plurality of regularly spaced, parallel slant tracks of a first type recording said VHS signal and diagonally crossing said magnetic tape at a predetermined angle similar to that in said conventional VHS recording format, each track of said first type having a predetermined spacing from closest neighboring others of said tracks of said first type similar to that in said conventional VHS recording format, having a first track width similar to that in said conventional VHS recording format, and having azimuth angles similar to that in said conventional VHS recording format; and a respective pair of slant tracks of a second type flanking each slant track of said first type and recording said other signal on the magnetic recording medium, said other recorded signal having non-return-to-zero modulation, the azimuth angle of each said pair of slant tracks of a second type being different from the azimuth angle of the slant track of said first type they respectively flank, the width of each slant track of said second type being substantially one-half the predetermined spacing between the slant tracks of said first type, so that two respective tracks of said second type are positioned in, and substantially fill said predetermined spacing between the slant tracks of said first type.

13. The magnetic tape of claim 12, wherein the azimuth angle of successive slant tracks of said first type alternate between two oppositely directed angles, and the azimuth angle of each pair of slant tracks of said second type is greater by a factor at least two than the azimuth angle of the slant track of said first type they respectively flank.

* * * * *